(12) United States Patent
Yang et al.

(10) Patent No.: US 6,424,650 B1
(45) Date of Patent: Jul. 23, 2002

(54) NETWORK ADDRESS FILTER DEVICE

(75) Inventors: Li-Jau (Steven) Yang, San Jose; Richard Traber, Fremont, both of CA (US)

(73) Assignee: 3Com Corporation, Santa Clara, CA (US)

(*) Notice: Subject to any disclaimer, the term of this patent is extended or adjusted under 35 U.S.C. 154(b) by 0 days.

(21) Appl. No.: 09/247,197

(22) Filed: Feb. 9, 1999

(51) Int. Cl.[7] .......................... H04L 12/56; G06F 12/10
(52) U.S. Cl. ...................... 370/390; 370/392; 370/401; 370/428; 370/432; 709/232; 709/238; 711/202; 711/216
(58) Field of Search ................................ 370/235, 236, 370/389, 390, 392, 400, 401, 428, 429, 432; 709/232, 236, 238, 245; 711/202, 206, 211, 216

(56) References Cited

U.S. PATENT DOCUMENTS

| | | | |
|---|---|---|---|
| 5,708,659 A | * 1/1998 | Rostoker et al. | 370/392 |
| 5,842,224 A | * 11/1998 | Fenner | 711/202 |
| 5,852,607 A | * 12/1998 | Chin | 370/401 |
| 5,920,900 A | * 7/1999 | Poole et al. | 711/216 |
| 6,266,705 B1 | * 7/2001 | Ullum et al. | 709/238 |

* cited by examiner

Primary Examiner—Alpus H. Hsu
(74) Attorney, Agent, or Firm—McDonnell Boehnen Hulbert & Berghoff

(57) ABSTRACT

A device and method for filtering addresses being transported through a high performance network, and rendering forwarding decisions for data frames corresponding to the address. Such data frames might correspond to multicast addresses wherein filtering is needed to prevent undesired data frames from being uploaded and processed by a receiving machine. The incoming address is hashed into an index for retrieving values from a table with a frame status. If the frame is valid, the same index is used to retrieve a table entry having address and address status information. If multiple data frames have been hashed into the same index, then further filtering is performed by the host machine or a processing device. Otherwise, the incoming address is compared with the address in the table entry. If a match occurs then the data frame is uploaded, and if no match then the frame is discarded. Frame status indicators in a bit register are used to direct actions performed on the frame. Further filtering, uploading, or discarding of the frames can be handled by a host driver, or by an on-board processor on a network interface device or card, via direction from the frame status indicators.

25 Claims, 4 Drawing Sheets

NETWORK ADDRESS FILTER DEVICE

BACKGROUND OF THE INVENTION

1. Field of the Invention

The present invention relates to a device for filtering addresses being transported through a high performance network, and rendering forwarding decisions for data frames corresponding to the address. Such data frames might correspond with a multicast address wherein filtering is needed to prevent undesired data frame uploading and processing by a receiving machine.

2. Description of Related Art

Computers and related devices are commonly networked together using known networking schemes to exchange packets or frames of data (often referred to as data packets, dataframes, or datagrams). Computers connected to a network are often referred to as hosts. On the Internet, the term host generally means any computer that has full two-way access to other computers on the Internet. Computers tied to a network employ some kind of a connection device, such as a network interface card (NIC) to communicate and exchange data with the network.

A variety of different network types exist. For example, a wide area network (WAN) is a geographically dispersed telecommunications network. A WAN may be privately owned or rented, but the term usually is construed to include public (shared user) networks. A WAN is distinguished as a broader telecommunication structure from that of a local area network (LAN). An intermediate form of network in terms of geography is a metropolitan area network (MAN). A LAN is a network of interconnected workstations sharing the resources of a single processor or server within a relatively small geographic area (e.g. an office building). Some common LAN technologies include: Ethernet, token ring, ARCNET (Attached Resource Computer Network), and FDDI (Fiber Distributed Data Interface). A LAN may serve only a few users, or by using FDDI, may serve several thousand over a much wider area. The server will usually have applications and data storage that are shared in common by multiple workstation users.

A LAN server can also be used as a Web server on the Internet if safeguards are taken to secure internal applications and data from outside access. On the Internet, certain protocols are used, including TCP (Transmission Control Protocol) and IP (Internet Protocol). TCP uses a set of rules for exchanging messages with other Internet connections at the information packet level. IP uses a set of rules to send and receive messages at the Internet address level. For IP Version 4, an IP address consists of a 32-bit number, and is used to identify each sender and receiver of information that is sent in packets across the Internet. Note that IP Version 6 uses 128 bits, and future versions will likely use even more bits to facilitate higher data traffic flows. TCP/IP assigns a unique number (or "IP number") to every workstation. This IP number is a four byte value that, by convention, is expressed by converting each byte into a decimal number (0 to 255) and separating the bytes with a period. An IP address has two parts: the identifier of a particular network on the Internet (first two bytes) and an identifier of the particular device (which might be a server or workstation, second two bytes) within that network. The range of IP addresses is divided into "classes" based upon the high order bits within the 32 bit IP address. Class A addresses are for large networks with many devices. Class B addresses are for medium-sized networks. Class C addresses are for small networks (fewer than 256 devices). Class D addresses are multicast addresses. Class E addresses are reserved.

The Open Systems Interconnection (OSI) standard is a system for transmission of messages between two points in a telecommunication network. The communication is divided into layers, with each layer adding certain additional functionality. For any given message, there will be a flow of data down through each layer at a sending point. At the receiving point, the data will flow up through the layers. The programming and hardware that furnishes these layers of functionality usually results from a combination of the computer operating system, applications, and TCP/IP or other network protocols. OSI divides a communication into seven layers. The layers are in two groups. The upper four layers are used when a message passes from or to a user. The lower three layers are used when any message passes through the host computer. Messages intended for this computer pass to the upper layers. Messages destined for some other host computer are not passed up to the upper layers but are forwarded to another host.

The seven OSI layers include: Layer 1, the physical layer, which conveys the bit stream through the network at the electrical and mechanical level; Layer 2, the data link layer, which provides error control and synchronization for the physical level; Layer 3, the network layer, which handles the routing and forwarding of data; Layer 4, the transport layer, which manages the end-to-end control and error-checking of data transfer; Layer 5, the session layer, which sets ups, coordinates, and terminates conversations, exchanges, and dialogs between the applications at each end; Layer 6, the presentation layer, which is usually part of the operating system and converts incoming and outgoing data from one presentation format to another (i.e. syntax layer); and Layer 7, the application layer, which is where communication partners are identified, quality of service is identified, user authentication and privacy are considered, and constraints on data syntax are identified. Referring again to Layer 2, or the data link layer (DLC), this protocol layer handles the moving of data in and out across the physical link in a network. The DLC contains two sublayers including Media Access Control (MAC) and Logical Link Control (LLC). On a LAN, for example, messages are sent between machines by supplying a six byte unique identifier, which is referred to as the MAC address.

Referring again to IP addresses belonging to Class D, a multicast address is used to send data to a large number of hosts on the Internet, rather than to a specific individual user. Not all hosts will actually use or process such data. Analogized to a radio or TV broadcast, the receiving party must have "tuned" their computer device to receive such data. For multicast addresses (in a 32 bit system), the lowest 4 bits are "1110" followed by the 28 bit multicast address. Hence, every IP datagram whose destination starts with "1110" is an IP multicast datagram. The machine or physical address (e.g MAC address) used within the local area network of an organization may be different than the IP address on the Internet. A typical example is the 48-bit Ethernet address (with Ethernet being a widely installed LAN technology). TCP/IP includes a facility called the Address Resolution Protocol (ARP) that lets the network administrator create a table that maps the 32-bit (4 byte) IP addresses to the 48-bit (6 byte) MAC addresses. (On an Ethernet LAN, the MAC address is the same as the Ethernet address)

A multicast address is transmitted to many hosts on a network. However, not all data frames associated with the multicast address are intended to pass through, and be processed by, the host machine. Hence, filtering of multicast addresses becomes important in order to improve the efficiency of a host machine. In past configurations, a multicast address filter uses the entire 6 byte destination address to perform a hashing function. Certain bits of the result will then be used as an index to a hash lookup table, with the table being initialized by a host machine driver or embedded firmware. If the indexed value in the lookup table is set, then the received data packet is passed through the filter and onto the host machine for further processing. If the indexed value in the lookup table is not set, then the data packet is discarded.

Hashing is the transformation of a string of characters into a usually shorter fixed-length value or key that represents the original string. Hashing is used to index and retrieve items from a table (or database). In general, hashing proves to be a faster method for indexing and finding an item, as it uses the shorter hashed key, rather than the original (longer) value. The hashing algorithm is called the hash function. Generally, a first hashed string will produce a different value than a second hashed string. However, the likelihood of the same resulting value from 2 different strings being produced by the hashing function increases as the number of bits output by the hash function decreases. The number of bits used depends upon the number of MAC addresses supported. For example, an 8 bit value is used if 256 MAC addresses are supported, and a 9 bit value for 512 MAC addresses, and so forth.

The probability of identical hash function values being produced from different input strings is extremely small, particularly as the number of bits output by the hash function approaches the number of bits input. In practice, however, a significantly smaller portion of the bits are actually used. For instance, 48 address bits are hashed down to 32 bits, thereby increasing the chance of duplication. Of the resulting 32 bits, an even fewer number is typically used to form the index. These factors substantially increase the chances of two indexes to the hash table being the same. This situation results in unwanted data frames being uploaded to the host machine, which consumes valuable processing power from the host central processing unit (CPU). This is an undesirable situation for a high performance network interface card.

Accordingly, an address filtering device and method are needed which will properly filter out unwanted addresses, and prevent their associated data frames from being uploaded and processed by a host machine. Typically this will be applied in the context of multicast addressing. Such filtering will thereby produce higher performance in the network interfacing card or device, and also the host machine.

SUMMARY OF THE INVENTION

The present invention provides a filtering device and method for preventing unwanted data frames from being passed through and processed by a receiving computer. A common application for such a device would include multicast filtering. The address associated with the data frame is hashed to produce an index to a lookup table which provides an initial status for the data frame. If the data frame is valid, then further processing is performed by a forwarding engine. An address table is included with entries having address status indicators and an address, with each entry similarly indexed per the hash value from the incoming address. If further processing is required, address status flags are read and verified. Based upon these flags, a comparison between the incoming address and the address entry from the address table is performed. A frame status register including a validity bit and multiplicity bit is updated. Based upon the frame status entries, the data frame is either discarded, or uploaded, or flagged for further processing and filtering by the host machine.

In particular, for a incoming data frame, a hash function is performed on the bits from a received MAC destination address using a polynomial cycle redundancy checking (CRC) algorithm. The hash function provides an index value. A lookup table is provided which contains a validity status for each incoming frame as indexed according to this result from the hash function. A forwarding engine is provided which discards or accepts the frame based upon the status of the indexed entry in the lookup table.

If the frame is accepted, then further filtering steps are performed. A MAC address table is further provided with entries indexed according to the same index values. Each table entry has an address status which includes a validity bit and a multiplicity bit, and the MAC destination address. The indexed entry is retrieved from the MAC address table and the validity bit of the address status is checked. If this bit is not set, then the frame is discarded and the validity bit in the frame status register is cleared. If the validity bit of the address status is set, then the multiplicity bit of the address status is checked. The multiplicity bit is used to indicate whether multiple MAC addresses of interest have been hashed into the same index value of the table entry. In practice, there will always be multiple MAC addresses that hash to the same value. This becomes significant, however, when more than one multicast address of interest hashes into the same index value. An address is "of interest" if that address is to be received by the host machine.

If the multiplicity bit of the address status is not set, then a full comparison is done between the incoming MAC destination address and the MAC address from the indexed table entry. If the addresses match, then validity bit is set and the multiplicity bit is cleared in the frame status entries. The frame status will then reflect a valid frame with a destination address which has been properly filtered. This will serve as an indicator for a host driver, on-board processor, or the like, that no further destination address filtering is needed. The frame will therefore be passed on, or uploaded, for further processing by the host computer. If the addresses do not match, then the validity bit in the frame status entries is cleared and the frame is discarded by the host machine.

If the multiplicity bit of the frame status entries is set, then this will indicate that the frame is valid, but that the frame has been hashed into a table entry with multiple destination addresses. This will serve as an indicator for the host driver, on-board processor, or the like, that such devices must perform further destination address filtering.

It is therefore one aspect of this invention to provide a filtering device which will prevent undesired data frames corresponding to certain addresses from being uploaded and processed by a receiving device.

It is another aspect of the present invention to provide a filtering device with a forwarding engine to further delineate whether an incoming MAC address is valid from an initial status check of a lookup table with hash indexed values.

It is still another aspect of the present invention to provide a MAC address table with entries having frame status bits and the MAC destination addresses indexed according the hash index values of the lookup table.

Another related aspect of the present invention is to compare the incoming MAC address with the indexed MAC destination address according to address status settings.

Still another aspect of the present invention is to set the frame status bits in the frame status register so that a driver or on-chip (on-board) processor can either upload the frame or perform further destination address filtering.

DETAILED DESCRIPTION

Figure 1:
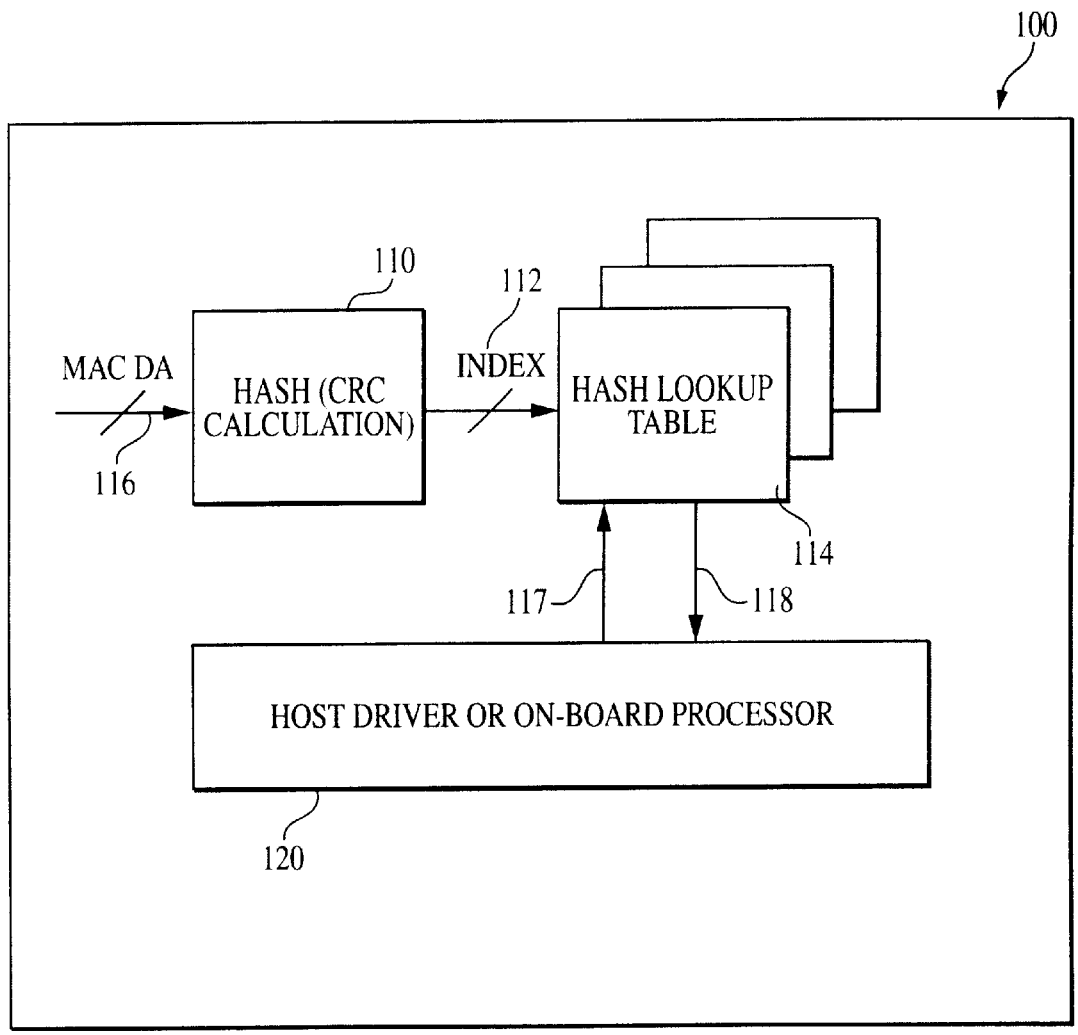
FIG. 1 is a block diagram of a prior art multicast filter device.

A detailed description of the preferred embodiments of the present invention is provided with reference to FIGS. 1–5, with FIG. 1 showing a prior art filtering configuration. The present invention provides a filtering device for preventing unwanted multicast data frames from being passed onto the host device for further processing.

FIG. 1 shows a prior art multicast address filtering device 100. The filtering device includes a hashing device 110 which performs a cyclic redundancy checking (CRC) function on a certain number bits from the incoming MAC destination address 116. CRC has traditionally been used as a method of checking for errors in data that has been transmitted on a communications link. A CRC device applies a 16 or 32 bit polynomial to a block of data to produce a resulting value. This value can similarly be used as a hashing function to transform a bit stream into a simpler representative value. In the device shown, certain lower bits of the incoming 6 byte destination address are used to generate a CRC value. Certain bits of the resulting CRC value are used for the hashed value. Mathematically, many thousands of MAC addresses will hash to the same value, but as more bits are used, the chances decrease of the same hashed value being produced for two different input strings. To speed up the processing, however, the number of bits used will generally depend upon the number of MAC addresses supported. Other relatively simple hash functions which are known in the field include: the division-remainder method, folding, radix transformation, and digit rearrangement.

The hashing device 110 thereby produces an index value 112 which is used to search through a hash lookup table 114. The hash lookup table contains status entries (typically "1" or "0") representing the validity of the data frame associated with each destination address. The table entries are initialized 117 by a driver on the host computer, or embedded firmware on the NIC, or other such means. The table entries are indexed according the index values 112. The index 112 can therefore be used to quickly search through the table 114 and provide the status 118 of the data frame corresponding to the incoming MAC destination address 116. If the status 118 is set to "1" then the received data packet passes the multicast filter and is uploaded to the host for further processing. Otherwise, the data packet is discarded by either the host driver or on-board processor, as represented by element 120.

Figure 2:
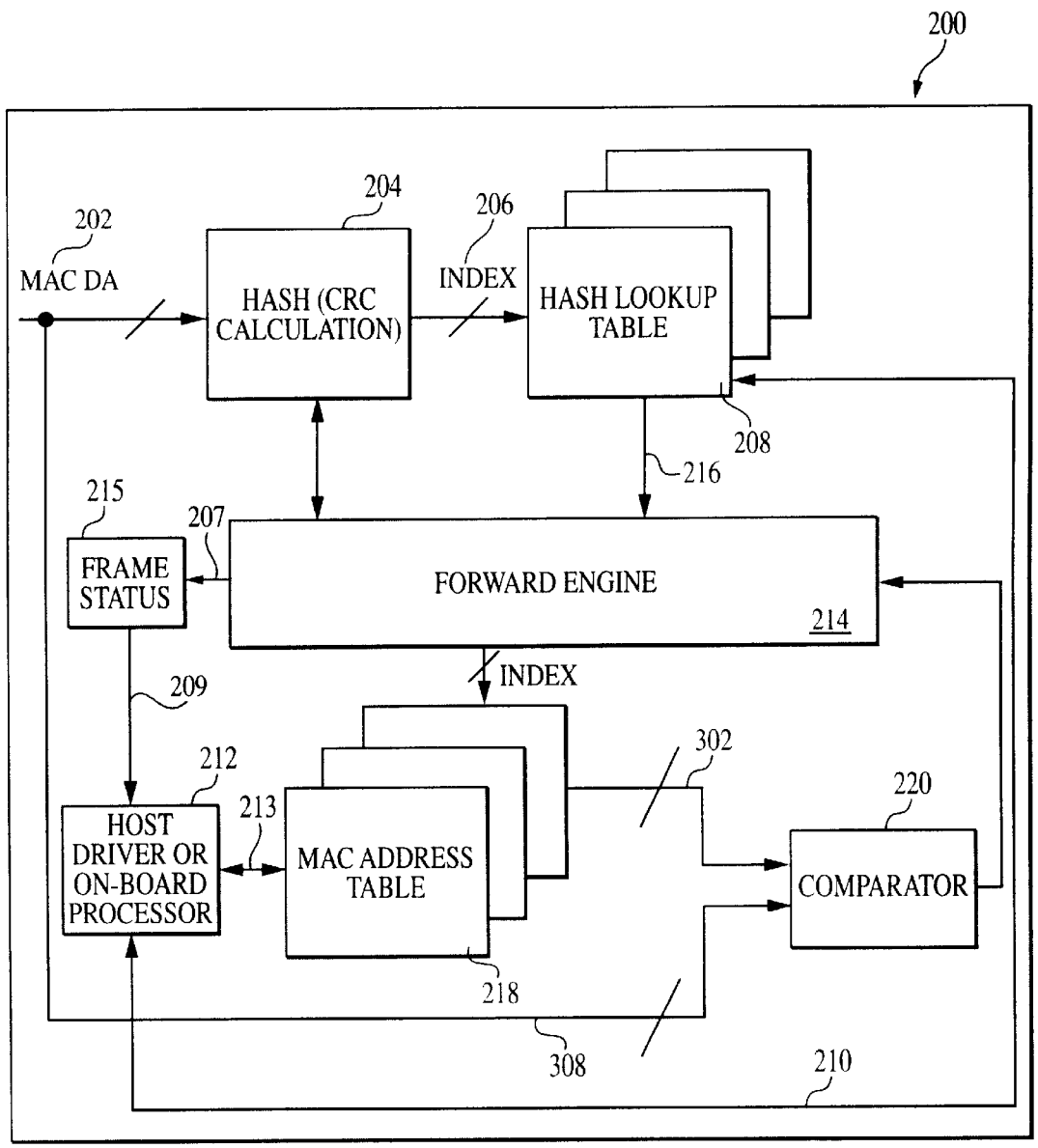
FIG. 2 is a block diagram of an embodiment of the multicast filter device according to the present invention.

FIG. 2 shows a block diagram of the MAC address filtering device 200 of the present invention, which can be used, in particular, for filtering multicast addresses. The MAC destination address 202 is directed to a hash device 204, as similar to the device 110 described above. The index value 206 is generated using a polynomial CRC algorithm, or similar such calculation for achieving an index value. For a system supporting 256 MAC addresses, the lower 8 bits of the hash value 204 would be used to form the index.

Also as before, the hash lookup table 208 is initialized (via an interconnection like 210) by either the host driver or on-board processor 212. The table 208 contains status flags (e.g. "1" or "0") regarding each indexed destination address. If the content of the status entry for a particular index value is "0", then this information will be passed on to the forward engine 214 via connection 216. The forward engine 214 will discard the data frame, and clear a validity bit in the frame status register (see details for FIG. 4 below) via interface line 207. However, if the content of the status entry is "1", then further processing takes place in the forward engine 214 in order to determine the validity of the incoming frame.

Figures 3, 4:
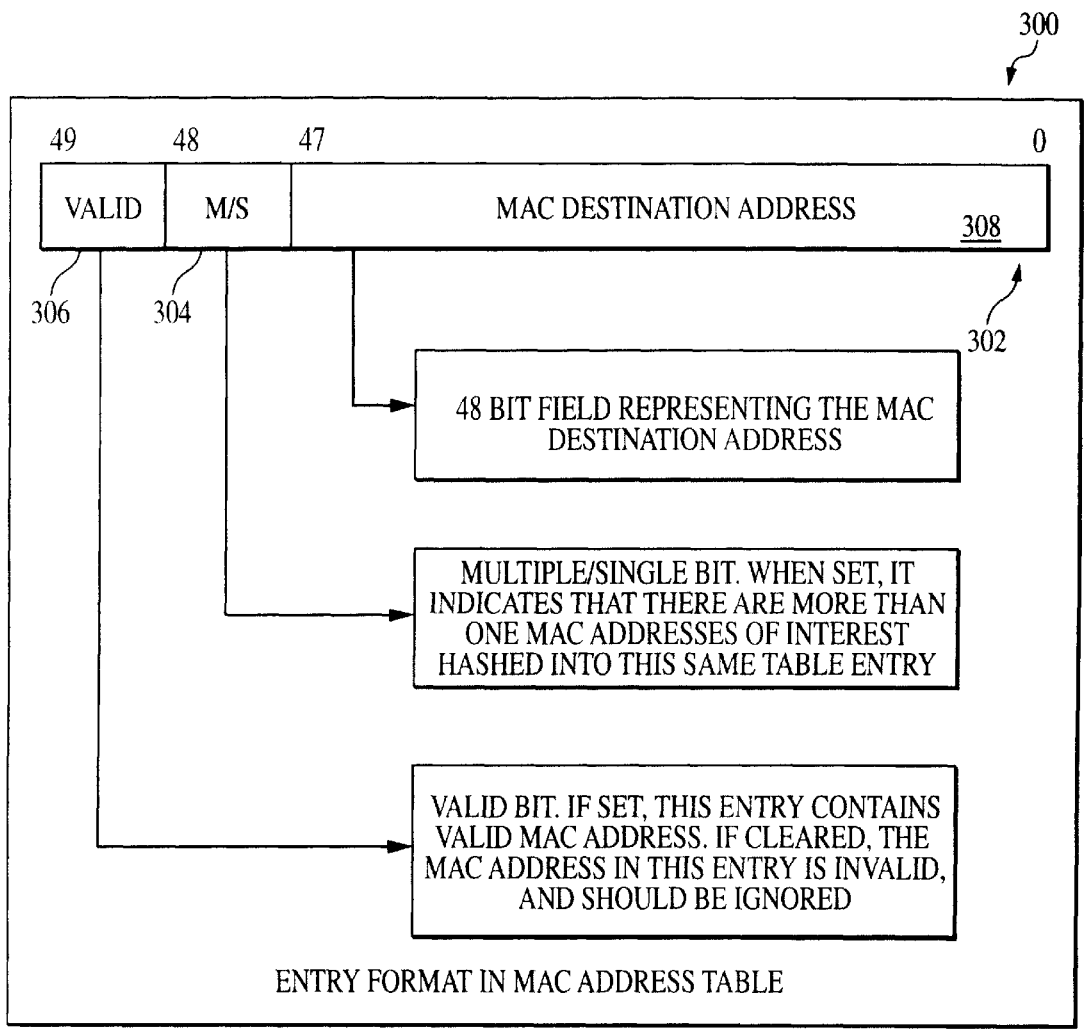
FIG. 3 is a block diagram showing the bit structure of an entry in the MAC address table element of FIG. 2.
FIG. 4 is a table showing settings and resulting actions for the frame status bits.

A MAC address table 218 is provided which uses the same hash index 206 as passed down through the forward engine 214. Hence the table entries are indexed accordingly. Referring also now to FIG. 3, the representative format 300 is shown for each entry in the MAC address table 218. Each entry 302 includes the 6 byte MAC destination address (e.g. 48 bits, or bits 0–47), along with frame status bits (or "flags") 48 and 49. Bit 48 is a multiple/single (M/S) status bit 304 which is set to "1" if there is more than one MAC address hashed into that same table entry. The M/S bit 304 is set to "0" if only one address is hashed into the table entry. Bit 49 is a validity (V) status bit 306 which is set to "1" if the entry contains a valid MAC address. The bit 306 is cleared if the MAC address in the entry is invalid, and the corresponding data frame should therefore be ignored. The status of bits 304 and 306 are initialized (or changed) by the host driver or on-board processor 212.

Referring now to FIG. 4, a table 400 is shown with the frame status entries (which are stored in a register or similar such device 215 shown in FIG. 2). Entry 404 is a multiple/single (or multiplicity) bit or flag. Entry 406 is a validity bit or flag. The table describes the action to be performed based upon the condition of the frame status bits 404 and 406. In both table entry instances 402 & 405 where the validity bit 406 is set to "0", the destination address is construed as not valid, and the data frame is discarded. In table entry 407, where the validity bit 406 is set to "1" and the M/S bit 404 is set to "0", the destination address (DA) has been filtered properly. No conflicts (often referred to as collisions) have occurred for table entries at a given index. The data frame corresponding to the DA is uploaded by the host device and no further DA filtering is needed. In table entry 408, where the validity bit 406 is set to "1" and the M/S bit 404 is also set to "1", then a collision has occurred and the DA was hashed to a table entry with multiple DAs. Under this frame status condition, the host driver or on-chip (on-board) processor must perform further DA filtering. Such filtering actions might include the host driver or processor comparing the received MAC destination address with a locally maintained database to decide whether the MAC address is valid or not.

Referring again to FIGS. 2–4, if the frame has been initially found to be valid via the status entry 216 from the hash lookup table 208, the forward engine 214 uses the index 206 to retrieve the corresponding entry in the MAC address table 218. The engine 214 then checks the validity bit 306 and discards the frame if the entry is clear (e.g. "0"). If the frame is valid, the engine 214 then checks the M/S bit 304. If the bit is set (e.g. "1"), then the frame status bits 404, 406 in the frame status register 215, are both set to "1" via data connection 207. The information is used by the host driver (or on-board processor) device 212 via data connection 209 to determine whether the frame should be uploaded.

If the M/S bit 304 is not set, then the comparator device 220 is used to perform a full 48 bit comparison of the incoming MAC destination address 202 with the MAC destination address 308 which is part of the indexed data entry 302. If the addresses match, then the validity bit 406 is set, and the M/S bit 404 is cleared in the frame status bits. Otherwise, if the frame is not valid, then the validity bit 406 is not set in the frame status entry 215. The frame status bits 404, 406 are thereafter used, as per the conditions shown in table 400 of FIG. 4, to further process the data frame.

Figure 5:
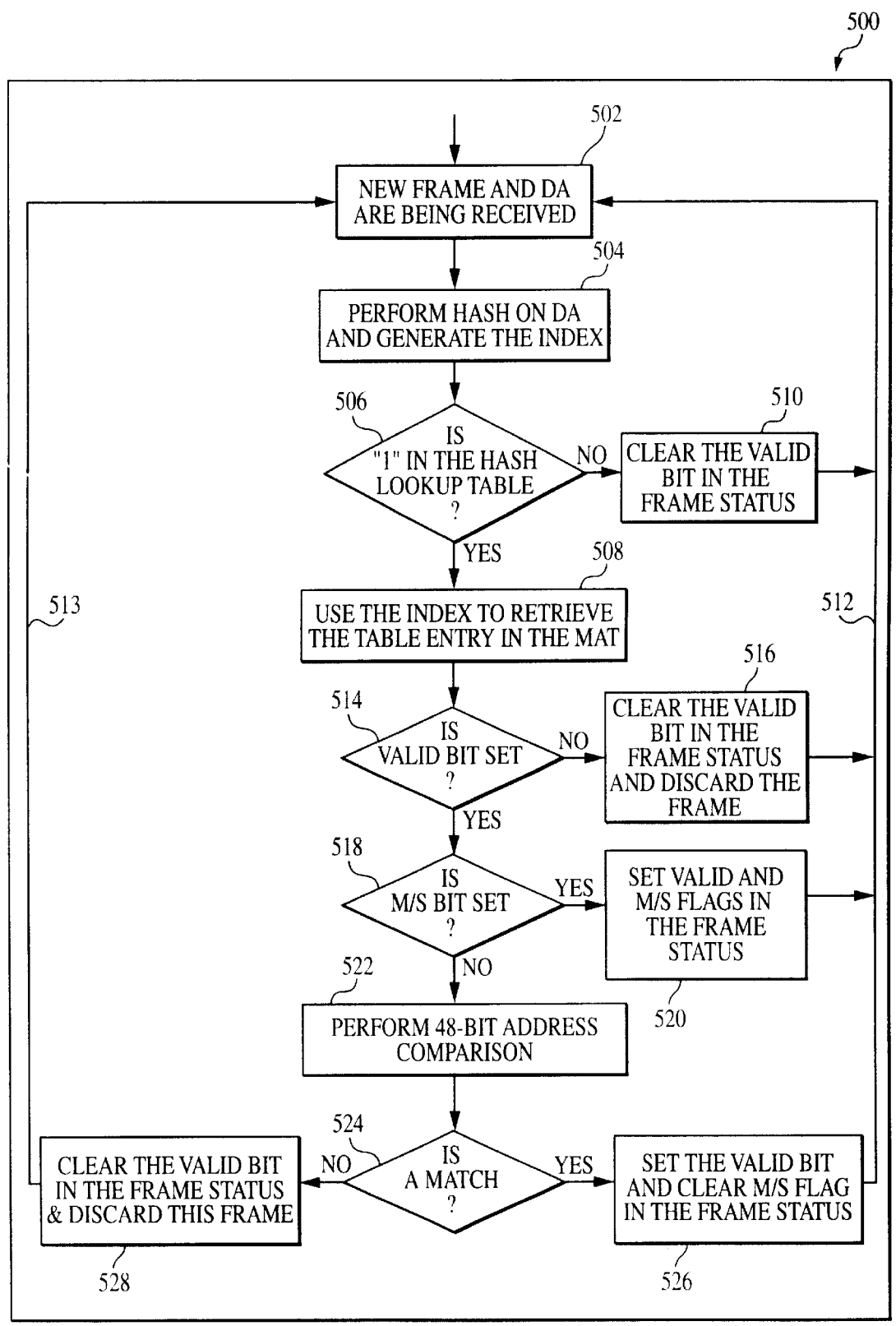
FIG. 5 is a flow chart showing the steps performed in filtering the data frame and associated multicast destination address.

Referring now to FIG. 5, a flowchart 500 is shown which further details the steps performed by the filtering device. In step 502, a new frame and DA are received by the filtering device. Step 504 performs a hash on the DA to generate the index for both the hash lookup table and the MAC address table. The index is used to perform a check 506 on the corresponding entry in the hash lookup table. If the lookup table entry is set to "0", then the frame is invalid, the validity bit in the frame status entries is cleared 510, and control is passed back 512 to receive a new frame. If the lookup table entry is set to "1", then the index is used to retrieve 508 the corresponding table entry in the MAC address table. The validity bit of the address status is checked 514 and if not set, then the validity bit of the frame status is confirmed cleared 516 and the frame is discarded, with control returning via 512 to receive a new frame. If the validity bit of the address status is set, then the M/S bit flag of the address status is checked 518. If this M/S bit is set then the validity bit and M/S bits of the frame status register are confirmed set 520, with control returning via 512 to receive a new frame. If the M/S bit of the address status is not set, then a fall comparison 522 is performed between the 48 bit (6 byte) MAC destination in the MAC address table, and the incoming destination address. The status of the comparison is verified 524, and if a match exists, then the validity bit is set and the M/S flag is cleared in the frame status entries, as shown in step 526, with control returning via 512. If the addresses do not match, then the validity bit is cleared in the frame status entries and the frame is discarded as shown in step 528, with control returning via 513 to receiving a new data frame and DA at 502.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An address filtering device coupled to a host machine for rendering decisions about forwarding data frames that are transported through a network to the host machine, the device comprising:
   a hash function device for receiving incoming addresses corresponding to the data frame and forming respective index values;
   a lookup table having status entries indexed according to the index values and providing a initial address status;
   an address table having entries indexed according to the index values, each entry having address status indicators and an entry address;
   a forwarding device which uses the index value to retrieve the corresponding address table entry and verify the data frame;
   frame status indicators which are set by the the forwarding device, wherein the frame status indicators are used by the host machine to direct actions on the data frames.

2. The address filtering device of claim 1, wherein the actions include those of discarding undesired data frames, directing the host machine to upload desired data frames, and invoking further filtering of data frames corresponding to multiple table entries.

3. The address filtering device of claim 2, wherein further included is a comparison device providing a comparison result, the device coupled to receive and compare the incoming address and the address from the indexed entry in the address table.

4. The address filtering device of claim 3, wherein the address status is used to indicate that multiple data frames result for an index value, and the frame status indicators are set to direct the host machine to perform further filtering.

5. The address filtering device of claim 3, wherein the address status is used to indicate that a single data frame results for an index value, and if the comparison result indicates a match, then the frame status indicators are set to direct the host machine to upload the data frame.

6. The address filtering device of claim 3, wherein the address status is used to indicate that a single data frame results for an index value, and if the comparison result does not indicate a match, then the frame status indicators are set to direct the host machine to discard the data frame.

7. The address filtering device of claim 1, wherein the incoming addresses are MAC destination addresses.

8. The address filtering device of claim 1, wherein the addresses are multicast addresses.

9. An address filtering device coupled to a host machine for rendering decisions about forwarding data frames that are transported through a network to the host machine, the device comprising:
   a hash function device for receiving incoming addresses corresponding to the data frame and forming respective index values;
   a lookup table having status entries indexed according to the index values and providing a initial address status;
   an address table having entries indexed according to the index values, each entry having address status indicators and an entry address;
   a forwarding device which uses the index value to retrieve the corresponding address table entry and verify the data frame;
   frame status indicators including a validity flag which is set by the forwarding device if the data frame is valid, and a multiple/single (M/S) flag which is set by the forwarding device when multiple data frames have been hashed into the same index value.

10. The address filtering device of claim 9, wherein the lookup table status entry is verified, and
   if the status entry is not set, then the data frame is not valid, the validity flag is cleared, and the data frame is discarded, and
   if the entry is set, then the data frame is valid and further processing is performed.

11. The address filtering device of claim 10, which further includes a comparison device coupled to receive and compare the incoming address and the address from the indexed entry in the address table.

12. The address filtering device of claim 11, wherein the address status includes a validity flag and a multiple/single (M/S) flag.

13. The address filtering device of claim 12, wherein if the validity flag is set, then the M/S flag is verified, and if the M/S flag is not set, then the comparison device is used to compare the addresses; and if the addresses match, then the frame status validity flag is set and the frame status M/S flag is cleared; and if the addresses do not match, then the frame status validity flag is cleared and the frame status data frame is discarded.

14. The address filtering device of claim 13, wherein the frame status indicators are used by a host machine driver to:

discard the data frame if the validity flag is clear;

upload the data frame if the validity flag is set and the M/S flag is clear; and invoke further address filtering if the validity flag is set, and the M/S flag is set.

15. The address filtering device of claim 13, wherein the frame status indicators are used by an on-board processor on a network interface device to:

discard the data frame if the validity flag is clear;

upload the data frame if the validity flag is set and the M/S flag is clear; and invoke further address filtering if the validity flag is set, and the M/S flag is set.

16. An address filtering method for use with devices coupled to a host machine, the method providing for decisions about forwarding incoming data frames having a destination address which are transported through a network to a host machine, the steps comprising:

retrieving address status and address information from a plurality of table entries;

using the address status to verify whether:

the data frame is invalid, wherein it should be discarded;

multiple data frames correspond to a table entry, wherein further filtering is needed;

multiple data frames do not correspond to a table entry, wherein the destination address is compared with the address information, and if the addresses match, uploading the data frame;

if the addresses do not match, discarding the data frame.

17. The address filtering method of claim 16, wherein further included is the step of:

initializing a table with entries having a data frame address and associated address status indicators.

18. The address filtering method of claim 17, wherein further included are the steps of:

performing a hash function on a portion of the destination address;

using the hash function result as an index to the entry;

using the address status to verify whether multiple data frames exist for an index; and if multiple data frames, then invoking further data frame filtering;

if not multiple data frames, then comparing the destination address with the address table address.

19. The address filtering method of claim 18, wherein further included are the steps of:

verifying whether the compared addresses match;

if the addresses match, then directing for upload of the data frame;

if the addresses do not match, then directing for discarding the data frame.

20. The address filtering method of claim 19, wherein the directing steps are achieved via setting frame status indicators which are accessed by the host machine.

21. An address filtering method for use with devices coupled to a host machine, the method providing for decisions about forwarding incoming data frames having a destination address which are transported through a network to a host machine, the steps comprising:

initializing a hash lookup table containing status entries;

initializing an address table containing address entries and associated address status indicators including a validity flag and multiplicity flag;

receiving a new data frame and associated destination address;

performing a hash function on a portion of the destination address to generate an index value to the table entries;

checking the hash lookup table entry;

if the entry is not set, then clearing a validity flag in a frame status indicator;

if the entry is set, then using the index value to retrieve the address table entry; and checking the validity flag in the address status indicators:

if the flag is not set, then clearing the frame status indicator validity bit;

if the flag is set, then checking the address status indicator multiplicity flag;

if the multiplicity flag is set, then setting both the multiplicity flags and validity flags in the frame status indicator;

if the multiplicity flag is not set, then comparing the received destination address with the address table entry address;

if the addresses match, then setting the validity flag and clearing the multiplicity flag in the frame status indicator;

if the addresses do not match, then clearing the validity flag in the frame status indicator.

22. The address filtering method of claim 21, wherein the frame status indicators are used by a host driver to further process the data frame.

23. The address filtering method of claim 21, wherein the further processing includes:

discarding the data frame if the validity flag is clear;

uploading the data frame if the validity flag is set and the M/S flag is clear;

invoking further address filtering if the validity flag is set, and the M/S flag is set.

24. The address filtering method of claim 21, wherein the frame status indicators are used by an on-board processor associated with a network interface device to further process the data frame.

25. The address filtering method of claim 24, wherein the further processing includes:

discarding the data frame if the validity flag is clear;

uploading the data frame if the validity flag is set and the M/S flag is clear;

invoking further address filtering if the validity flag is set, and the M/S flag is set.

* * * * *